US008396516B2

(12) United States Patent
Rogo

(10) Patent No.: US 8,396,516 B2
(45) Date of Patent: Mar. 12, 2013

(54) SINGLE-ANTENNA VEHICLE TRANSPONDER WITH A POWER-SAVE FUNCTION

(75) Inventor: Johan Rogo, Habo (SE)

(73) Assignee: Kapsch TrafficCom AB (SE)

( * ) Notice: Subject to any disclaimer, the term of this patent is extended or adjusted under 35 U.S.C. 154(b) by 0 days.

(21) Appl. No.: 13/252,904

(22) Filed: Oct. 4, 2011

(65) Prior Publication Data
US 2012/0083227 A1 Apr. 5, 2012

(30) Foreign Application Priority Data
Oct. 5, 2010 (EP) .................................... 10186530

(51) Int. Cl.
H04B 1/38 (2006.01)
H04B 1/16 (2006.01)
(52) U.S. Cl. .................... 455/574; 455/343.1; 455/343.5
(58) Field of Classification Search ................. 455/41.1, 455/41.2, 343.1, 343.2, 343.5, 127.1, 127.5, 455/574; 340/10.1, 10.3
See application file for complete search history.

(56) References Cited

U.S. PATENT DOCUMENTS

| 5,355,513 | A  | * | 10/1994 | Clarke et al. ..................... 455/20 |
| 5,621,412 | A  | * | 4/1997  | Sharpe et al. ............... 340/10.33 |
| 6,593,845 | B1 | * | 7/2003  | Friedman et al. ........... 340/10.33 |
| 7,072,697 | B2 | * | 7/2006  | Lappetelinen et al. ....... 455/574 |
| 7,133,704 | B2 | * | 11/2006 | Twitchell, Jr. ................ 455/574 |
| 7,209,771 | B2 | * | 4/2007  | Twitchell, Jr. ................ 455/574 |
| 7,613,484 | B2 | * | 11/2009 | Lappetel inen et al. ...... 455/574 |
| 2009/0058604 | A1 |   | 3/2009  | Jung et al. |

FOREIGN PATENT DOCUMENTS
EP 2101287 A1 9/2009
* cited by examiner

Primary Examiner — Sonny Trinh
(74) Attorney, Agent, or Firm — Schwegman Lundberg & Woessner, P.A.

(57) ABSTRACT

Embodiments of the present invention relates to a vehicle transponder comprising an active radio unit, an antenna, a wake-up unit and a power directing means which has a first port, a second port and a third port, where the power directing means is arranged to direct power from the first port to the second port and/or the third port. The antenna is connected to the first port and the second port is connected to the radio unit. Furthermore, the third port is connected both to a power detection port at the radio unit and to the wake-up unit, such that during a first mode of operation, a part of a signal that is transmitted from the radio unit to the antenna is coupled from the second port to the third port and further fed to the power detection port.

9 Claims, 4 Drawing Sheets

SINGLE-ANTENNA VEHICLE TRANSPONDER WITH A POWER-SAVE FUNCTION

RELATED APPLICATION

This application claims the benefit of priority under 35 U.S.C. Section 119, to European Patent Application Serial No. 10186530.1, filed Oct. 5, 2010; which application is incorporated herein by reference in its entirety.

TECHNICAL FIELD

The present invention relates to a vehicle transponder comprising an antenna and a power directing means, the power directing means having a first port, a second port and a third port. The power directing means is arranged to direct power from the first port to the second port and/or the third port. The transponder further comprises an active radio unit and a wake-up unit, where furthermore the antenna is connected to the first port of the power directing means and the second port of the power directing means is connected to the radio unit.

BACKGROUND ART

At some places there is a demand for controlling the flow of vehicles, and one way to perform such a control is to use fee collection systems, where vehicles passing a road side station are debited a certain fee, where the fee may vary, by way of example for different types of vehicles and for different times.

Normally, each road side station is equipped to communicate to vehicle transponders, which are positioned in the vehicles. Each transponder is normally arranged to receive a signal from the toll station and to respond, where the response for example comprises vehicle identification data.

Each transponder normally comprises a switch that is arranged to switch between transmission and reception of the active radio unit and, if the transponder comprises a single antenna, for example a switch or directional coupler to couple the antenna to either the radio unit or wake-up circuitry depending on the mode of operation.

A battery powered transponder is suitably equipped with power saving means that is arranged to start a power saving mode, where a certain stimuli signal wakes the transponder when it is in power saving mode. In this way, the transponder may save battery energy. In the power saving mode, the antenna is coupled to the wake-up circuitry.

Furthermore, in order to control transmitted output power from an active radio unit, a transponder is normally equipped with a directional coupler on the output, where a predetermined part of the transmitted power is fed back to a radio unit in the transponder, allowing the radio unit to control the transmitted output power.

However, a transponder with power feedback and a wake-up circuitry comprises a number of parts as indicated above, and there is a desire to obtain a less complex arrangement for obtaining the same functionality in a transponder.

SUMMARY OF THE INVENTION

The object of the present invention is to obtain a vehicle toll transponder that comprises a wake-up circuit and a feedback loop for transmitted output power, where the number of components is reduced.

This object is obtained by means of a vehicle transponder comprising an antenna and a power directing means, the power directing means having a first port, a second port and a third port. The power directing means is arranged to direct power from the first port to the second port and/or the third port. The transponder further comprises an active radio unit (8) and a wake-up unit (9), where furthermore the antenna is connected to the first port of the power directing means and the second port of the power directing means is connected to the radio unit. The third port of the power directing means is connected both to a power detection port at the radio unit and to the wake-up unit (9), such that during a first mode of operation, a part of a signal that is transmitted from the radio unit to the antenna is coupled from the second port of the power directing means to the third port of the power directing means and further fed to the power detection port, enabling control of transmitted output power from the radio unit. The degree of signal that is coupled from the second port to the third port is dependent on the connection properties between said second port and third port.

According to an example, the power directing means is in the form of a first switch, where, during the first mode of operation, the first switch is arranged to connect the first port of the first switch to the second port of the first switch, where a part of a signal that is transmitted from the radio unit to the antenna is coupled from the second port of the first switch to the third port of the first switch and further fed to the power detection port.

According to another example, the power directing means is in the form of a power dividing means, where, during the first mode of operation, the power dividing means is arranged to connect the first port of the power dividing means to the second port of the power dividing means, where a part of a signal that is transmitted from the radio unit to the antenna is fed from the second port of the power dividing means to the third port of the power dividing means and further fed to the power detection port.

According to another example, the transponder further comprises a second switch, where the second port of the power directing means is connected to the radio unit via the second switch, such that, during the first mode of operation, the signal that is transmitted from the radio unit to the antenna is fed via the second switch and the power directing means.

According to another example, the third port of the power directing means is also connected to the wake-up unit, where the wake-up unit is arranged to be connected to the antenna via the power directing means during a second mode of operation, where, at the reception of a certain signal via the antenna, the wake-up unit is arranged to initiate the first mode of operation, the power directing means being arranged to connect the antenna to the wake-up unit during the second mode of operation, and to connect the antenna to the second switch during the first mode of operation.

Other examples are evident from the dependent claims.

A number of advantages are evident from the present invention, primarily a less complex arrangement in a transponder which still provides the same functionality is obtained. In this way, a less expensive and less bulky transponder is acquired.

BRIEF DESCRIPTION OF THE DRAWINGS

The present invention will now be described more in detail with reference to the appended drawings, where.

DETAILED DESCRIPTION

Figure 1:
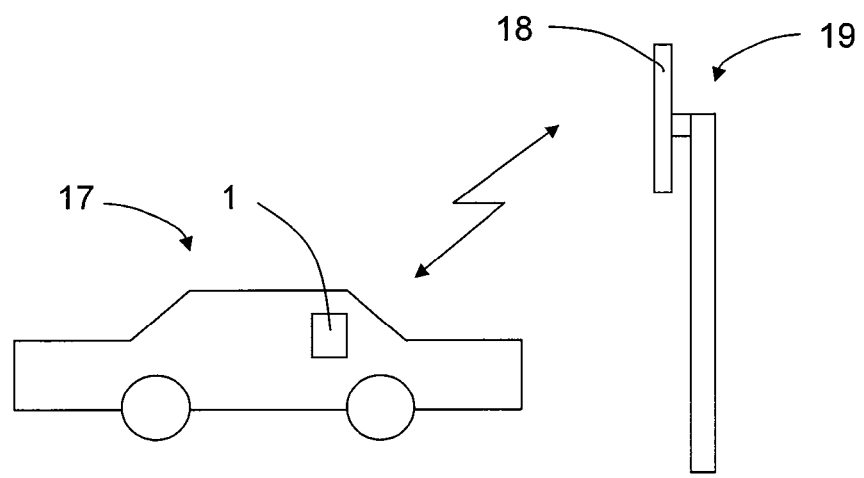
FIG. 1 schematically shows a vehicle and a road side station.

With reference to FIG. 1, a vehicle 17 that passes a road side station 19 is arranged to communicate with the road side station 19 by means of an on-board unit in the form of a vehicle transponder 1. The communication is performed in order to execute information exchange between the road side station and the transponder, where the information exchange is used for debiting the vehicle a certain road toll fee. Such a debiting may be performed in many ways, and these details will not be discussed here, since they are well-known.

Figure 2:
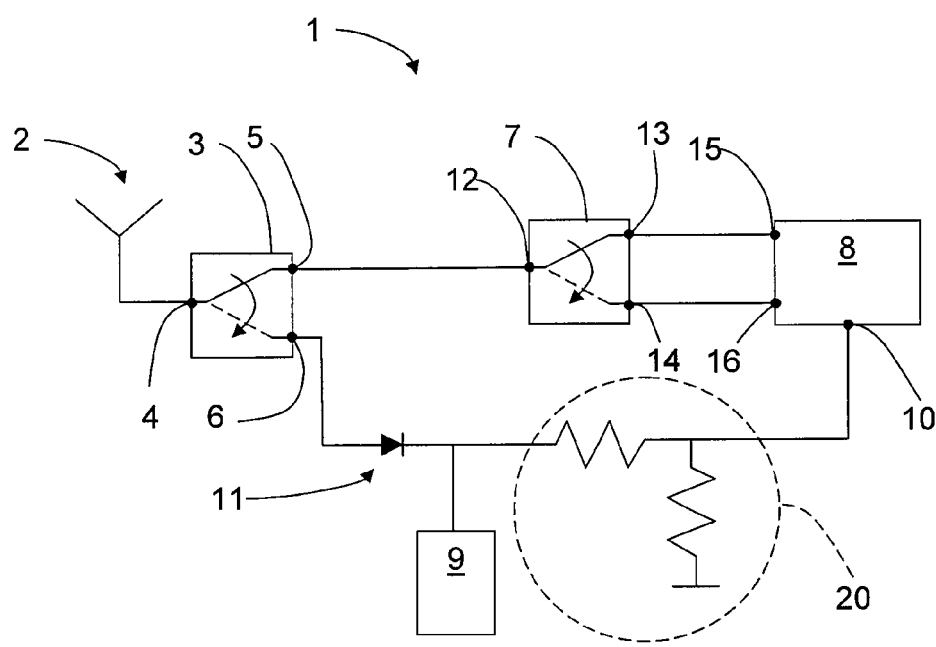
FIG. 2 shows simplified schematics for a vehicle transponder according to a first example of the present invention.

With reference to FIG. 2, showing a first example, the vehicle transponder 1 comprises an antenna 2 and a first switch 3, where the first switch 3 comprises a first port 4, a second port 5 and a third port 6. The first switch 3 is arranged to switch from the first port 4 to either the second port 5 or the third port 6.

The transponder further comprises an active radio unit 8, where the antenna 2 is connected to the first port 4 of the first switch 3, and the second port 5 of the first switch 3 is connected to the radio unit 8.

The transponder further comprises a second switch 7, where the second switch 7 is arranged to switch between a transmitting mode and a receiving mode of the radio unit. 8. The second switch 7 comprises a first port 12, a second port 13 and a third port 14, where the second switch 7 is arranged to switch from the first port 12 to either the second port 13 or the third port 14. The second port 13 of the second switch 7 is connected to a receive port 15 of the radio unit 8, and the third port 14 of the second switch 7 is connected to a transmit port 16 of the radio unit 8.

During a first mode of operation, a signal that is transmitted from the radio unit 8 to the antenna 2 is fed via the second switch 7 and the first switch 3, and a signal that is received is fed from the antenna 2 to the radio unit 8 via the first switch 3 and the second switch 7.

The third port 6 of the first switch 3 is connected to a wake-up unit 9 that is connected to the antenna 2 via the first switch 3 during a second mode of operation, where, at the reception of a certain signal via the antenna 2, the wake-up unit 9 is arranged to initiate the first mode of operation.

The first switch 3 is thus arranged to connect the antenna 2 to the wake-up unit 9 during the second mode of operation, and to connect the antenna 2 to the second switch 7 and further to the radio unit 8 during the first mode of operation.

According to the present invention, the third port 6 of the first switch 3 is connected to a power detection port 10 at the radio unit 8. In the transmitting mode, during the first mode of operation, where the first switch 3 connects the first port 4 of the first switch 3 to the second port 5 of the first switch 3, a part of a signal that is transmitted from the radio unit 8 to the antenna 2 is coupled from the second port 5 of the first switch 3 to the third port 6 of the first switch 3. The coupled signal is further fed to the power detection port 10, where the degree of coupling is dependent on the isolation between said second port 5 and third port 6.

In this way, by measuring the power of the coupled signal, it is possible to control transmitted output power from the radio unit 8.

In accordance with the present invention, the first switch 3, which basically is used for switching between the first mode of operation and the second mode of operation, i.e. between transmission/reception and power saving, is also used as a coupler for coupling a predetermined part of transmitted power back to the radio unit 8 in a feed-back loop.

Figure 3:
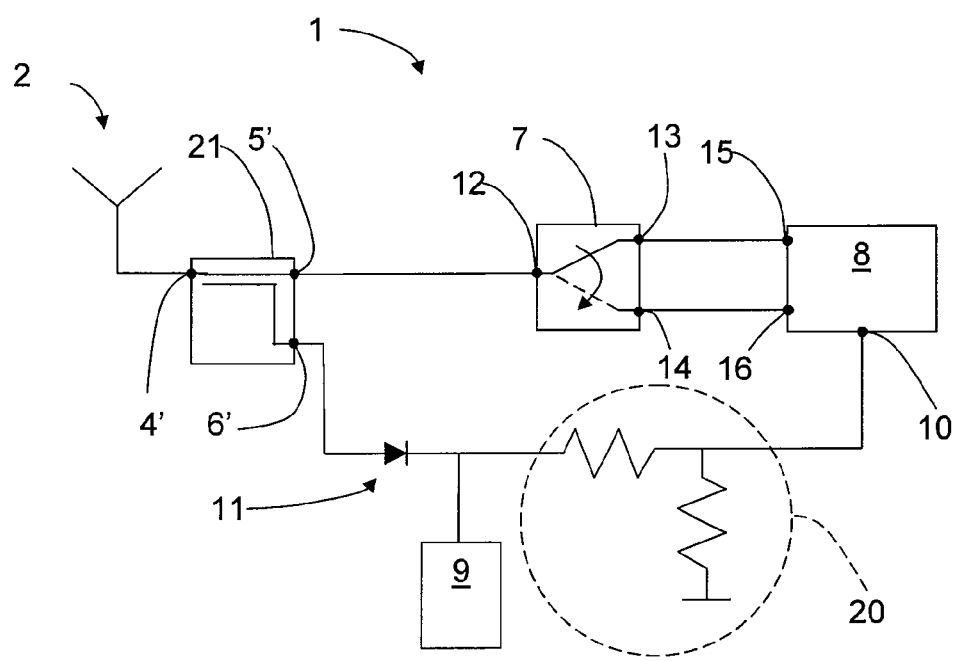
FIG. 3 shows simplified schematics for a vehicle transponder according to a second example of the present invention.

In a second example, with reference to FIG. 3, a directional coupler 21 is used instead of the first switch. The directional coupler 21 comprises a first port 4', a second port 5' and a third port 6', where these ports 4', 5', 6' correspond to the ports 4, 5, 6 of the first switch 3 in the first example.

Figure 4:
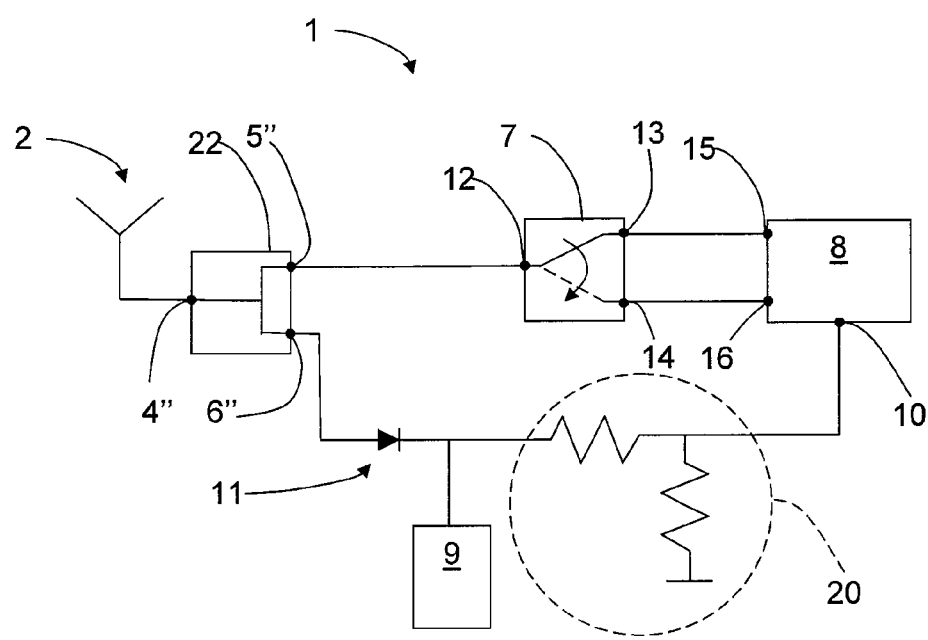
FIG. 4 shows simplified schematics for a vehicle transponder according to a third example of the present invention.

In a third example, with reference to FIG. 4, a power divider 22 is used instead of the first switch. The power divider 22 comprises a first port 4", a second port 5" and a third port 6", where these ports 4", 5", 6" correspond to the ports 4, 5, 6 of the first switch 3 in the first example.

In the second and third example, the first port 4', 4" is always connected to both the second port 5', 5" and the third port 6", 6", but with a certain degree of connection that depends on the coupling factor at the directional coupler 21 and the power division properties of the power divider 22.

Generally, the directional coupler 21 and the power divider 22 may be regarded as power dividing means 21, 22.

Thus, during the first mode of operation, the power dividing means 21, 22 is arranged to connect the first port 4', 4" of the power dividing means 21, 22 to the second port 5', 5" of the power dividing means 21, 22, where a part of a signal that is transmitted from the radio unit 8 to the antenna 2 is fed from the second port 5', 5" of the power dividing means 21, 22 to the third port 6', 6" of the power dividing means 21, 22 and further fed to the power detection port 10.

Generally, for all the examples, the first switch 3, the directional coupler 21, the power divider 22 and similar devices which are possible to use at their position to enable the antenna 2 to be connected to the wake-up circuit 9, the receive port 15 and the transmit port 16 of the radio unit 8, and the power detection port 10, may be regarded as a power directing means 3, 21, 22. The degree of signal that is directed from the second port 5, 5', 5" to the third port 6, 6', 6" is dependent on the connection properties between said second port 5, 5', 5" and third port 6, 6', 6".

The present invention is not limited to the embodiments shown above, but may vary freely within the scope of the dependent claims. For example, the third port 6 of the first switch 3 is preferably connected to the wake-up unit 9 and the power detection port 10 via a rectifying diode 11. Furthermore, the third port 6 of the first switch 3 may be connected to the power detection port 10 at the radio unit 8 via a resistor power dividing network 20.

By means of the present invention, one rectifying diode 11 may be used for both the wake-up circuit 9 and the power detection port 10. The rectifying diode may alternatively be regarded as a schematic representation of a rectifying circuit, comprising a number of rectifying diodes.

The power detection port does not have to be positioned at 10 the radio unit 8, but may be positioned at a separate control unit, which in turn controls the radio unit 8.

The second switch 7 may be realized in any suitable way.

The radio unit may comprise a chip arranged for Wireless Access in Vehicular Environment (WAVE), which is a standard for Dedicated Short Range Communications (DSRC).

The transponder may be used for any kind of communication between a road side station and a vehicle, not only communication related to fee collection, thus not only being constituted by a vehicle toll transponder, but generally by any type of vehicle transponder.

The invention claimed is:

1. A vehicle transponder comprising:
an antenna, and
a power directing means, the power directing means having a first port, a second port and a third port, where the power directing means is arranged to direct power from the first port to the second port and/or the third port,
where the transponder further comprises an active radio unit and a wake-up unit, and
where furthermore the antenna is connected to the first port of the power directing means and the second port of the power directing means is connected to the radio unit,
wherein the third port of the power directing means is connected both to a power detection port at the radio unit and to the wake-up unit, such that during a first mode of operation, a part of a signal that is transmitted from the radio unit to the antenna is coupled from the second port of the power directing means to the third port of the power directing means and further fed to the power detection port, enabling control of transmitted output power from the radio unit,
where the degree of signal that is coupled from the second port to the third port is dependent on the connection properties between said second port and third port.

2. A vehicle transponder according to claim 1, wherein the power directing means is in the form of a power dividing means, where, during the first mode of operation, the power dividing means is arranged to connect the first port of the power dividing means to the second port of the power dividing means, where a part of a signal that is transmitted from the radio unit to the antenna is coupled from the second port of the power dividing means to the third port of the power dividing means and further fed to the power detection port.

3. A vehicle transponder according to claim 1, wherein the power directing means is in the form of a first switch, where, during the first mode of operation, the first switch is arranged to connect the first port of the first switch to the second port of the first switch,
where a part of a signal that is transmitted from the radio unit to the antenna is coupled from the second port of the first switch to the third port of the first switch and further fed to the power detection port.

4. A vehicle transponder according to claim 1, wherein the transponder further comprises a second switch, where the second port of the power directing means is connected to the radio unit via the second switch, such that, during the first mode of operation, the signal that is transmitted from the radio unit to the antenna is fed via the second switch and the power directing means.

5. A vehicle transponder according to claim 1, wherein the wake-up unit is arranged to be connected to the antenna via the power directing means during a second mode of operation, where, at the reception of a certain signal via the antenna, the wake-up unit is arranged to initiate the first mode of operation, the power directing means being arranged to connect the antenna to the wake-up unit during the second mode of operation, and to connect the antenna to the second switch during the first mode of operation.

6. A vehicle transponder according to claim 1, wherein the third port of the power directing means is connected to the wake-up unit and the power detection port via a rectifying diode.

7. A vehicle transponder according to claim 1, wherein the second switch comprises a first port (12), a second port and a third port, where the second switch is arranged to switch from the first port to either the second port or the third port,
where the second port of the second switch is connected to a receive port of the radio unit, and the third port of the second switch is connected to a transmit port of the radio unit.

8. A vehicle transponder according to claim 1, wherein the vehicle transponder is positioned in a vehicle and arranged to communicate with an antenna at a road side station.

9. A vehicle transponder according to claim 1, wherein the third port of the power directing means is connected to the power detection port at the radio unit via a resistor power dividing network.

* * * * *